(12) United States Patent
Carrier et al.

(10) Patent No.: US 6,286,609 B1
(45) Date of Patent: Sep. 11, 2001

(54) AC/DC CHOPPER FOR POWER TOOL

(75) Inventors: David A. Carrier, Eldersburg; Andrew E. Seman, Jr., Baltimore; Christopher R. Yahnker, Eldersburg; Samuel G. Woods, Bel Air, all of MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 09/526,682

(22) Filed: Mar. 16, 2000

Related U.S. Application Data (63) Continuation-in-part of application No. 08/458,285, filed on Dec. 10, 1999.

(51) Int. Cl.$^7$ ...................................................... H02J 7/00
(52) U.S. Cl. ................................. 173/1; 173/2; 173/217; 310/50; 318/254; 318/701
(58) Field of Search ........................ 173/217, 171, 173/117, 2, 1; 310/47, 50; 318/254, 439, 701, 492

(56) References Cited

U.S. PATENT DOCUMENTS

| | | | |
|---|---|---|---|
| 3,757,194 | * 9/1973 | Weber et al. | 310/50 |
| 4,574,225 | 3/1986 | Pershall et al. | |
| 4,835,410 | * 5/1989 | Bhagwat et al. | 310/50 |
| 5,424,624 | 6/1995 | Senak, Jr. | |
| 5,553,675 | * 9/1996 | Pitzen et al. | 173/217 |
| 5,563,487 | 10/1996 | Davis | |
| 5,715,146 | * 2/1998 | Yilmaz | 363/142 |
| 5,816,121 | * 10/1998 | Yoshimizu et al. | 173/217 |
| 5,984,020 | * 11/1999 | Meyer et al. | 173/217 |

* cited by examiner

*Primary Examiner*—Scott A. Smith
(74) *Attorney, Agent, or Firm*—Harness, Dickey & Pierce, P.L.C.

(57) ABSTRACT

A dual-mode system for inexpensively operating electrically powered double-insulated devices (12), such as hand-held power tools and appliances. The system includes a cordless battery power module (14) that supplies the power and current demands of the device (12) in a cordless mode or a chopper module (21) that supplies the necessary power and current demands in a physical envelope commensurate in size and interchangeable with that of the battery power module (14). The chopper module (21) is provided with a non-filtered high efficiency converter circuit that allows the chopper module (21) to generate the power and current required by the driven device (12). The inductance of the motor (11) for the driven device (12) is used to filter the output of the chopper module (21). Eliminating the output filter from the chopper module (16) significantly reduces the cost and size of the module (16). Additionally, the need for multiple battery packs and fast rechargers is minimized by the availability of a low-cost converter. The line power module (16) includes an EMI filter (15) for filtering AC or DC input power. The chopper module (21) chops the filtered voltage, providing a series of voltage pulses having a DC voltage level that is suitable for driving the motor (11).

27 Claims, 8 Drawing Sheets

AC/DC CHOPPER FOR POWER TOOL

CROSS-REFERENCE TO RELATED APPLICATIONS

This application is a continuation-in-part of U.S. nonprovisional application Ser. No. 09/458,285 filed Dec. 10, 1999.

FIELD OF THE INVENTION

The present invention relates generally to electrically operated power tools and in particular, to portable hand-held power tools which can alternatively operate in either a cordless mode from a self-contained power source or a corded mode from conventional AC mains or an AC/DC generator.

BACKGROUND OF THE INVENTION

An electrically operated device that functions in a cordless mode typically is powered by a removable battery pack. The battery pack completely encloses one or more cells and provides the necessary DC power for operation of the device. Historically, cordless electrically powered devices have included relatively low power devices such as shavers and hand-held calculators. Recent improvements in battery technology have led to the development of batteries that store more energy and are capable of driving higher power devices. These devices include for example, portable handheld power tools and appliances operating at power levels from 50 watts up to hundreds of watts. Using cordless power devices permits work operations to be performed in areas where a conventional AC power source is not available or is inconvenient to use. However, the use of cordless devices is limited by the effective charge capacity of the battery pack and the availability of replacement battery packs. When the battery pack is discharged, it must be recharged or replaced with a fully charged pack. Therefore, to compensate for the limited operating duration; extra battery packs or an optional corded AC converter module must be used with the cordless power device, or a corded power tool must be provided.

Both batteries and battery chargers are expensive in comparison to the power device for which they are intended. Batteries for high power applications cost approximately 30% of the cost of the applicable power device. Additional batteries are required to permit cordless mode operation while a battery is recharged and to replace dead batteries. High power levels drawn from batteries during operation of the power tool, the depth of discharge of the battery, the number of charge/discharge cycles, and the speed with which a battery is recharged all contribute to shortening the usable lifetime of a battery. To recharge batteries either a fast charger or a trickle charger must typically be used. A fast charger can be a significant portion of the cost of the power tool or appliance that is powered by the battery. A trickle charger is significantly less expensive than a fast charger, however a trickle charger requires approximately ½ day to recharge a battery pack. A fast charger on the other hand can recharge a battery pack within approximately one hour or less. Therefore, a trade off must be made between using a trickle charger with a large number of battery packs versus using a costly fast charger with very few replacement battery packs.

An optional corded AC converter module has only recently been provided for portable cordless power tools. The AC converter module connects to an AC power source and is designed to be interchangeable with the battery pack. The corded converter module converts power from the AC source to a regulated low-voltage DC level that is usable by the motor of the power device. Such a device allows a tool operator to use the tool in either the cordless battery mode or the corded AC mode as needed. Thus, the availability of such a device enables the operator of a cordless tool to complete a project when the battery pack has been discharged, or to continue to use the tool while the battery pack is charging and a fully charged backup battery pack is unavailable. Hence, by using a corded converter module the need for extra battery packs is reduced.

To increase the desirability of a corded converter module over the choices of additional battery packs or a separate corded power device, it is necessary to provide the desired output power capability at the lowest possible cost while maintaining a high quality device. The cost of a corded converter module is strongly related to the output power capability of the converter module. The higher the output power capability, the higher the cost. Therefore, it is desirable to design the output power capability of the corded converter module to be comparable to the output power capability of the corresponding battery pack. In addition, the maximum envelope of a corded converter module must conform to the envelope of the battery pack with which it is interchangeable. With the introduction of cordless tools of 24 volts and greater, the envelope of a conventional corded converter module is adequate for supporting the power output levels required to drive power devices such as hand held power tools. In tool voltages of 18 volts and below, the smaller battery pack sizes pose a challenge to the designer of an equally powered chopper circuit. Therefore, the main constraints on the output power capability of a corded converter module are the goals of minimizing size and cost and increasing reliability. Previously, attempts to minimize the cost of corded converter modules have concentrated on matching the output power capability of the converter module to a given power tool power requirement and then minimizing the cost of the resulting converter module components. By designing the converter module for the minimum output power required to satisfactorily drive the power tool, lower cost electronic components can be chosen for the converter. However, merely selecting the lowest cost devices that will attain the desired output power capability typically only results in marginal cost savings.

To obtain significant cost savings it is generally necessary to eliminate components from the design of the corded converter module. In a previously filed application, the power transformer that is used in a conventional corded converter module to meet government safety requirements was eliminated (see U.S. application Ser. No. 09/458,285). Instead of using the power transformer to meet the safety requirements, a double insulated case was relied upon. Generally, the power magnetics including power transformers and power inductors are amongst the more costly components within a corded converter module. Typically, conventional corded converter modules use a power inductor in combination with an output capacitor to filter voltage that is applied to the power tool motor. The power inductor is typically a custom designed device that is bulky and expensive in comparison with the other components of the corded converter module. The filtered voltage from the power inductor is applied to the motor, which has an inductance that is inherent in the construction of the motor. Optimizing the design of the power inductor to match the desired output power capability merely provides marginal cost savings.

Operators of cordless power tools already faced with the cost of battery packs and battery chargers must also invest in expensive corded converter modules for their power tools. As an alternative many purchase a corded power tool to use in lieu of the cordless tool when an AC power source is nearby. Attempts to minimize the cost of corded conversion modules have been constrained by the cost of using power inductors in combination with an output capacitor to filter the voltage supplied to the motor. Obtaining further cost reductions by reducing the output power level of a corded converter module would result in under-powered power devices. While the prior art can be used to provide corded converter modules for a handheld power tool, it has not proven capable of providing low cost modules that are convenient to use.

SUMMARY OF THE INVENTION

The present invention decreases costs by filtering the motor drive voltage in a unique manner. The invention uses the inductance of the power tool motor windings rather than employing a discrete output filter. Eliminating the power inductor and output capacitor from the corded converter module significantly reduces the cost and weight of the module. A low cost corded power module provides operators of cordless power tools the low cost option of using a corded power module when AC power sources are available. This eliminates the cost of purchasing a separate corded power device as well as reducing the number of battery packs that must be purchased.

Corded power modules designed without output filters are substantially less expensive than modules designed with output filters. Additionally, eliminating the output filter decreases the weight of the module resulting in improved operator comfort.

For a more complete understanding of the invention, its objects and advantages, reference may be had to the following specification and to the accompanying drawings.

DESCRIPTION OF THE PREFERRED EMBODIMENT

Figure 1:
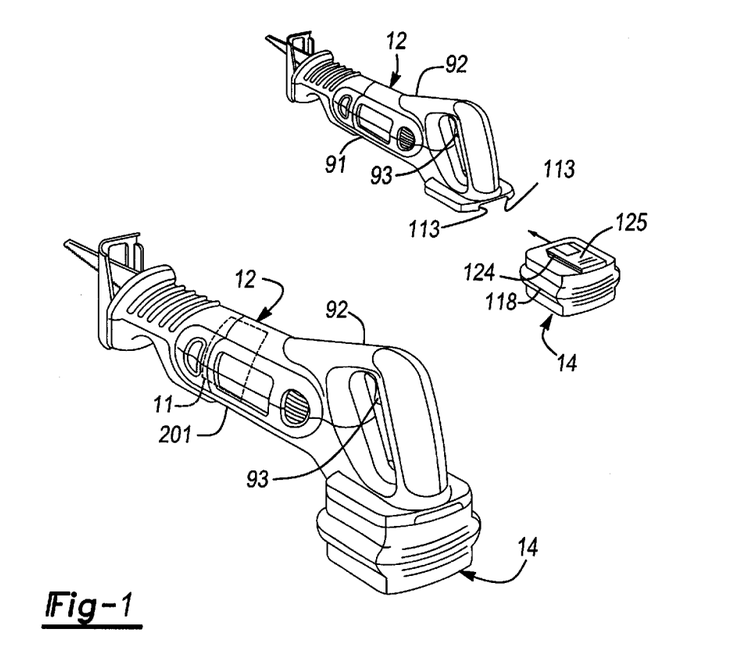
FIG. 1 is a three-dimensional view partially showing the manner of connecting a battery power module to the power device.
Figure 2:
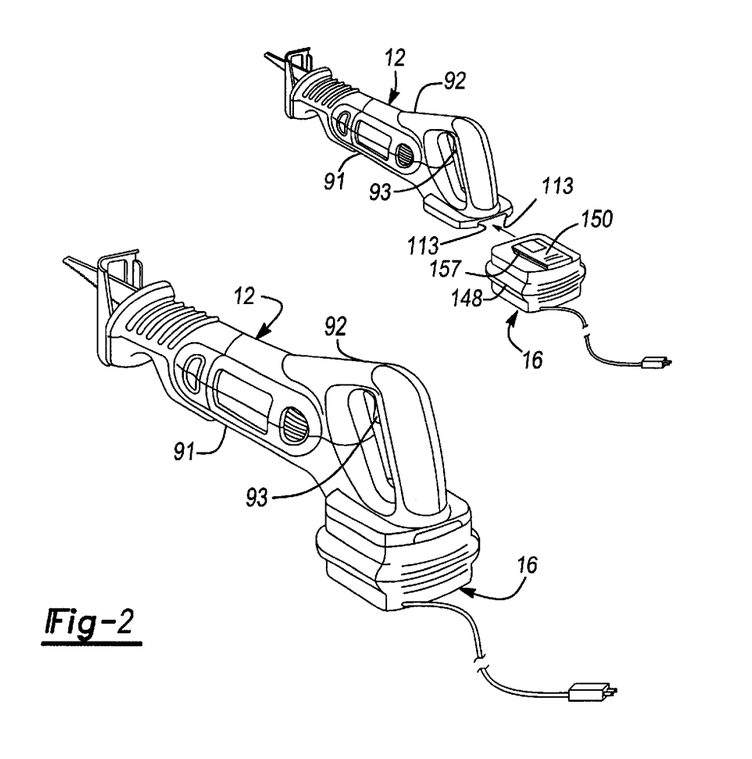
FIG. 2 is a three-dimensional view partially showing the manner of connecting a line power module to the power device.

Referring to FIGS. 1 and 2, a dual-mode portable power tool 12 according to the present invention is shown. While the present invention is shown and described with a reciprocating saw 12, it will be appreciated that the particular tool is merely exemplary and could be a circular saw, a drill, a sander, or any other similar portable power tool constructed in accordance with the teachings of the present invention.

The power tool 12 includes a tool interface (not shown) which is driven through a gear train (not shown) by a DC motor 11. The motor 11 is mounted within a housing 91 that includes a handle 92 extending therefrom. A trigger switch 93 is mounted in the handle 92 behind the motor 11. The DC motor 11 is adapted in the preferred embodiment to be powered by a 24 volt DC source, although other DC voltage systems, such as 18 volts or 100 volts, could be used. In a first operating mode shown in FIG. 1, the power tool 12 is powered by a removable battery power module 14. Alternatively, as shown in FIG. 2, the power tool 12 may be powered from common 115 volt AC line power via a line power module 16 which is adapted to be plugged into the power tool in place of the battery power module 14. Additionally, the power tool 12 may be powered from 100 VAC, or 240 VAC, as well as from a DC generator (not shown) via the line power module 16. Following the description of the electrical circuitry, a more detailed description of the mechanical configuration of the power tool 12 is provided.

Figure 3:
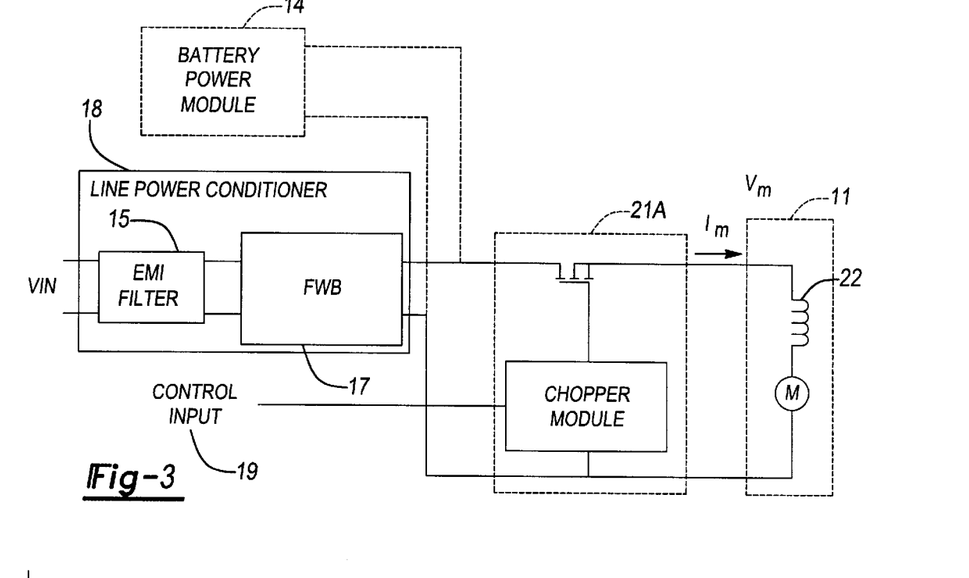
FIG. 3 is a block diagram of a first configuration of a tool power system constructed in accordance with the teachings of the invention.
Figure 4:
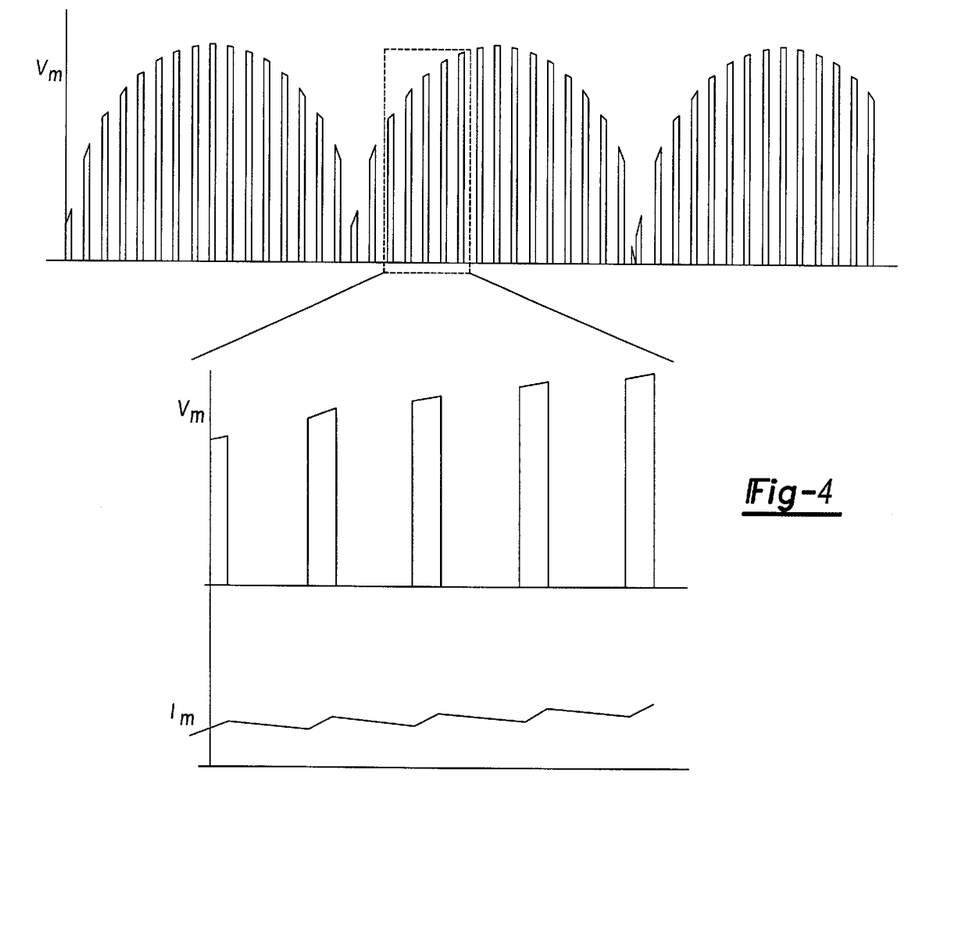
FIG. 4 is signal diagram showing the voltage and current waveforms associated with the chopper module.

Referring to FIG. 3, a first embodiment of a tool power system constructed in accordance with the teachings of the invention is illustrated. The power system includes a chopper module 21a that converts a rectified AC or DC input voltage to a chopped output voltage that is applied to the motor 11. In the presently preferred embodiment, the chopper module 21a uses a transformerless configuration, however it is within the scope of the invention to use a transformer isolated configuration such as a forward, half-bridge, and flyback. In addition, although the present embodiment operates at a fixed frequency of 25 kHz, it is envisioned that the power system can be operated at higher or lower operating frequencies as will be explained later in this specification. A line power conditioner 18 coupled to common 115 volt AC provides line power. The line power conditioner 18 includes an EMI filter 15 to attenuate high frequency conducted emissions that are conducted from the chopper module 21a onto the AC line. A full wave bridge rectifier (FWB) 17 connected to the EMI filter 15 rectifies the line voltage. The chopper module 21a chops the rectified voltage and supplies the chopped voltage to the DC motor 11, thereby providing controlled power for the power tool 12. Output filtering, such as a power inductor and output capacitor, is not used to attenuate the switching frequency AC components. Instead, the inductance 22 of the motor 11 is relied upon to filter the chopped voltage. FIG. 4 illustrates the chopped voltage, Vm, applied to the motor 11, and the motor current, Im, that results from the averaging effect of the motor inductance 22. Relying on the inductance 22 of the motor 11 to filter the output voltage negates the need for an output filter within the chopper module 21a, thereby decreasing the cost of the power tool 12 and requiring less volume for the line power conditioner 18. The selected switching frequency of the chopper module is strongly affected by the value of the inductance 22. The switching frequency of the chopper module is preferably chosen so that the magnitude of current flowing through the motor inductance 22 varies by less than approximately 10% of the average current at the switching frequency. However, it is within the scope of the invention to select a switching frequency so that the magnitude of current flowing through the motor inductance 22 varies by less than approximately 40%. A control input 19 provides a signal for setting the duty cycle of the chopper module 21a, so that the average DC voltage applied to the DC motor 11 is maintained within the operating range of the motor 11. In the embodiment, the control input 19 is an open loop signal provided by a trigger switch on the power tool, however it is within the scope of the invention to provide closed loop control of the power tool by monitoring power tool parameters such as motor current, back EMF voltage and motor speed. Sensors for monitoring the power tool parameters include tachometers, motor back EMF voltage monitors, motor current monitors, motor average voltage monitors, and DSPs of motor current commutation.

The chopper module 21a is alternatively powered by the battery power module 14, which supplies a DC voltage from a battery pack (not shown). The battery power module 14 connects to the chopper module 21a in lieu of the line power conditioner 18. In operation, DC voltage from the battery power module 14 is chopped by the chopper module 21a in response to the control input 19 and supplied to the DC motor 11. Similar to operation from the AC line, the chopped voltage is filtered across the internal inductance 22 of the motor 11, providing an average DC voltage within the operating range of the motor 11.

Figure 5:
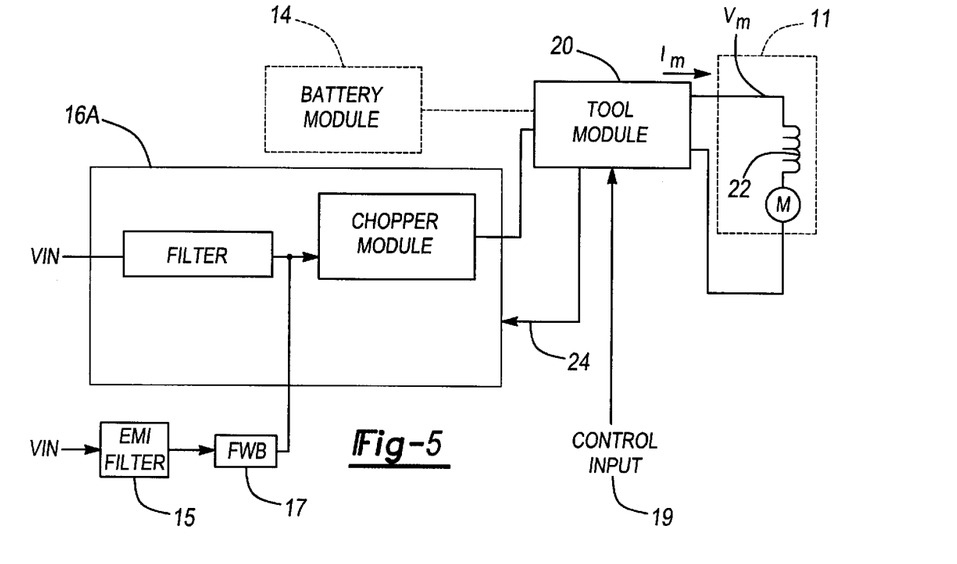
FIG. 5 is a block diagram of a second configuration of a power system for the power device.

Illustrated in FIG. 5 is a block diagram of a presently preferred embodiment of a power subsystem for the power tool 12, constructed in accordance with the principles of the invention. The power subsystem includes a line power module 16a that converts line power to a chopped voltage that is supplied to a tool module 20. Alternatively, a battery power module 14 provides a DC voltage to the tool module 20 from a battery pack (not shown). The tool module 20 has two operating modes. When connected to the line power module 16, the tool module 20 supplies the chopped voltage from the line power module 16 to the DC motor 11. In addition, the tool module 20 receives a control input 19 corresponding to a trigger switch position (not shown) and sends a corresponding PWM control signal 24 to the line power module 16 to control the duty cycle of the chopped voltage. When connected to the battery power module 14, the tool module 20 chops the DC voltage from the battery pack and supplies the chopped voltage to the DC motor 11. The duty cycle of the chopped voltage is regulated by the control input 19.

Figure 6:
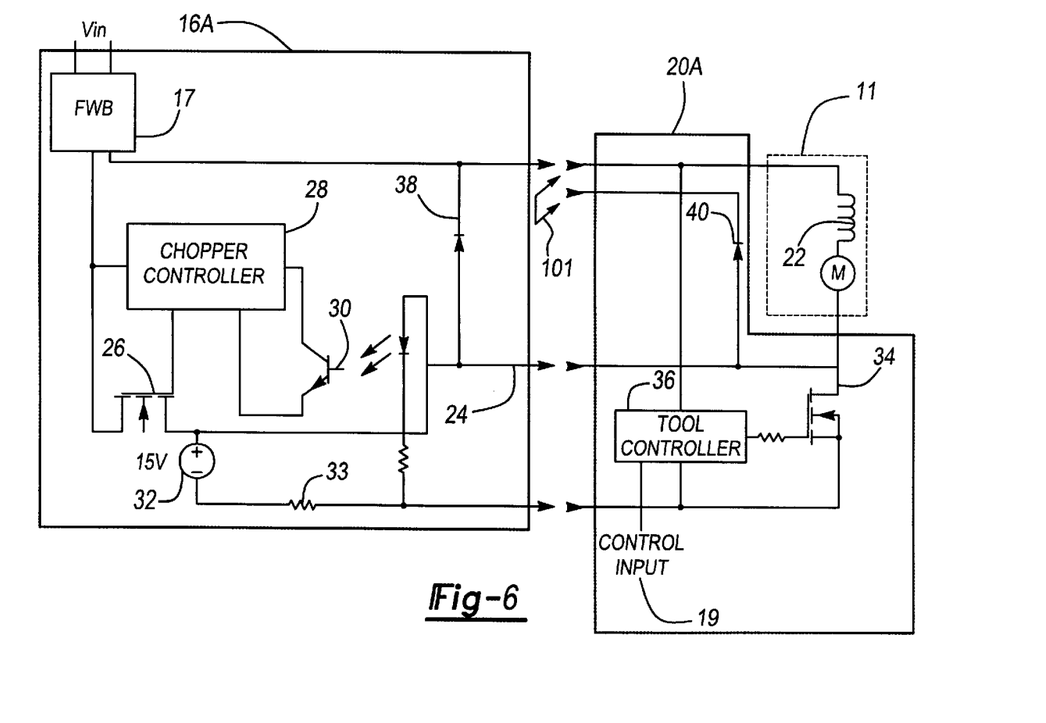
FIG. 6 is a detailed block diagram of a first embodiment of the second configuration of a power system for the power device.

Illustrated in FIG. 6 is a detailed diagram of a first embodiment of a power tool power subsystem conforming to the principles of the invention. The power subsystem includes a line power module 16a that converts line power to a chopped voltage that is supplied to a tool module 20a. Alternatively, a battery power module (not shown) provides a DC voltage to the tool module 20a from a battery pack (not shown).

The line power module 16a includes an EMI filter (not shown) and full wave bridge rectifier (FWB) 17 for filtering and rectifying input line power. A series switch 26 for repetitively chopping the input power is connected in series with the output of the FWB 22 and the motor 11. A chopper controller 28 supplies a drive signal to control the operation of the series switch. An interface circuit 30 is connected from the tool module 20a to the chopper controller 28. Although in the present embodiment the interface circuit is an optocoupler, the scope of the invention includes other interface circuits such as differential amplifiers and signal transformers. The interface circuit 30 receives a duty cycle signal 24 from the tool module 20a for controlling the duty cycle of the series switch 26. A voltage source 32 with a series resistor 33 provide a current path for the duty cycle signal 24 from the tool module 20a. A free-wheeling diode 38 supplies a current path for the motor current during time periods when the series switch 26 is not conducting.

Continuing to refer to FIG. 6, the tool module 20a has two operating modes. When connected to the line power module 16a, the tool module 20a supplies the chopped voltage from the line power module 16a to the DC motor 11. In addition, the tool module 20a receives a control input 19 corresponding to a trigger switch position (not shown), and sends the corresponding duty cycle signal 24 to the line power module 16a to control the duty cycle of the chopped voltage. When connected to the battery power module 14 (FIG. 3), the tool module 20a chops the DC voltage from the battery pack and supplies the chopped voltage to the DC motor 11. The duty cycle of the chopped voltage is regulated by a control input 19.

The tool module 20a includes a series switch 34 for sending the duty cycle signal 24 to the line power module 16a and for chopping the DC voltage from the battery power module (not shown). A tool controller 36 controls the tool module series switch 34 in response to the control input 19. A free-wheeling diode 40 connects to the battery power module to provide a current path for freewheeling motor current when the battery power module (not shown) is connected to the tool module 20a. The diode 40 is selected to be a Schottky diode or other fast recovery diode to reduce conduction losses.

Referring to FIG. 6, the operation of the illustrated embodiment during line power mode is as follows. The operator adjusts the trigger switch position to provide a desired control input 19 to the tool module controller 36. In response to the control input, the tool module controller controls the operation of the tool module series switch 34 that alternately provides a short and an open across the voltage source 32 and series resistor 33. When an open is applied, current flows through the voltage source 32, the series resistor 33, and the input to the interface circuit 30. The output signal from the interface circuit is averaged by the chopper controller 28 and used to control the pulse width of the line power module series switch 26. As will be recognized by those skilled in the art, it is within the scope of the invention to synchronize the chopper control 28 to the output signal from the interface circuit and use the pulse width of the signal superimposed on the chopper pulse to drive the series switch 26. In response to the series switch 26 turning on, current flows from the FWB 17 through the internal inductance of the motor 11, and the line power module series switch 26 before returning to the FWB 17. When the series switch 26 turns off, the current that was ramping up through the internal inductance 22, begins to ramp down as it flows from the internal inductance 22 through the motor 11 and then back through the line power module free-wheeling diode 38.

During the battery power mode, the line power module 16a is replaced by a battery power module (not shown). Once again, the operator adjusts the trigger switch position to provide a desired control input 19 to the tool module controller 36. In response to the control input, the tool module controller controls the operation of the tool module series switch 34 that alternately turns on and off. Pulse width modulation is employed in the embodiment, however it is within the scope of the invention to use other modulation methods such as frequency modulation. When the switch 34 is on, current flows from the battery power module, through the internal inductance and the motor 11, and the tool module series switch 34 before returning to the battery power module. When the series switch 34 turns off, the current that was ramping up through the internal inductance 22, begins to ramp down as it flows from the internal inductance 22, through the motor 11, through the tool module free-wheeling diode 40, and then through the battery power module jumper wire 101. This jumper wire 101 is a key solution to the conflicting ratings of low voltage diode 40 and high voltage diode 38.

Figure 7:
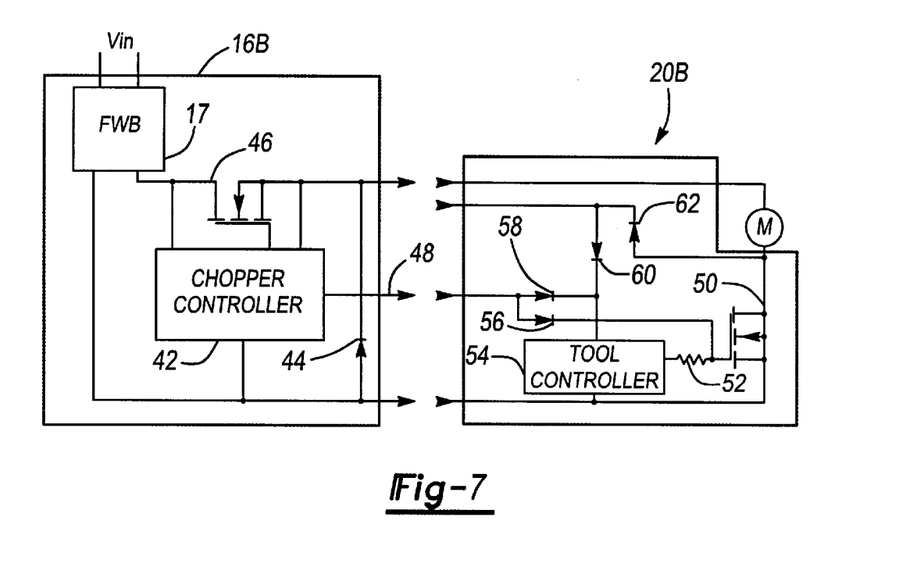
FIG. 7 is a detailed block diagram of a second embodiment of the second configuration of a power system for the power device.

Referring to FIG. 7, a second embodiment of a power tool power system conforming to the principles of the invention is illustrated. The second embodiment includes a chopper module 16b for chopping line power during line power mode, and a tool module 20b for chopping battery during battery power mode. The chopper module 16b comprises a FWB 17, a chopper controller 42, a free-wheeling diode 44, and a series switch 46. The FWB 17 rectifies 120 Vac, 60 Hz input power. The series switch 46 chops the rectified line power and couples the chopped signal through the tool module 20b to the motor 11. The chopper controller 42 controls the series switch 46 in response to a duty cycle signal 48 from the tool module 20b. The free-wheeling diode 44 provides a conduction path for current from the motor 11 when the series switch 46 is in the non-conducting state.

The tool module 20b comprises a series switch 50 for chopping battery power during the battery power mode. A low voltage MOSFET having a breakdown voltage slightly greater than the battery voltage is used as the series switch 50. During line power mode the series switch 50 is turned on continuously to prevent the line voltage from overstressing the device Vds breakdown voltage. A gate resistor 52 is coupled between a tool controller 54 and the series switch 50. The tool controller 54 supplies a pulse width modulated output that drives the tool module series switch 50 during battery power mode and supplies the duty cycle signal to the chopper module 16b during line power mode. A diode 58 is connected from a module power port 48 to the tool controller 54 for supplying circuit power. A signal diode 56 for providing the duty cycle signal to the chopper module 16b is connected from the module power port 48 to the input of the series switch 50. A power diode 60 for supplying an alternate source of circuit power during battery power mode is connected from the motor power input to the tool controller 54. A free-wheeling diode 62 is connected in parallel with the motor 11 through the battery power module jumper wire (not shown) for providing a current path for current from the motor 11 during battery power mode.

The operation of the second embodiment is similar to the operation of the first embodiment with the exception of the method of coupling the pulse width signal from the tool module 20b to the chopper module 16b. During line power mode, the chopper module 16b forces the tool module series switch 50 on continuously and provides circuit power to the tool module 16b through the module power port 48. When the output of the tool module controller 54 is in the high state, the signal diode 56 is reverse-biased preventing current from the chopper module 16b from flowing into the tool controller 54. When the output of the tool module controller 54 is in the low state, the signal diode 56 is forward-biased permitting current to flow from the chopper module 16b into the tool controller 54. The chopper controller 42 obtains the duty cycle information by sensing the change in current magnitude of the duty cycle signal 48.

Figure 8A:
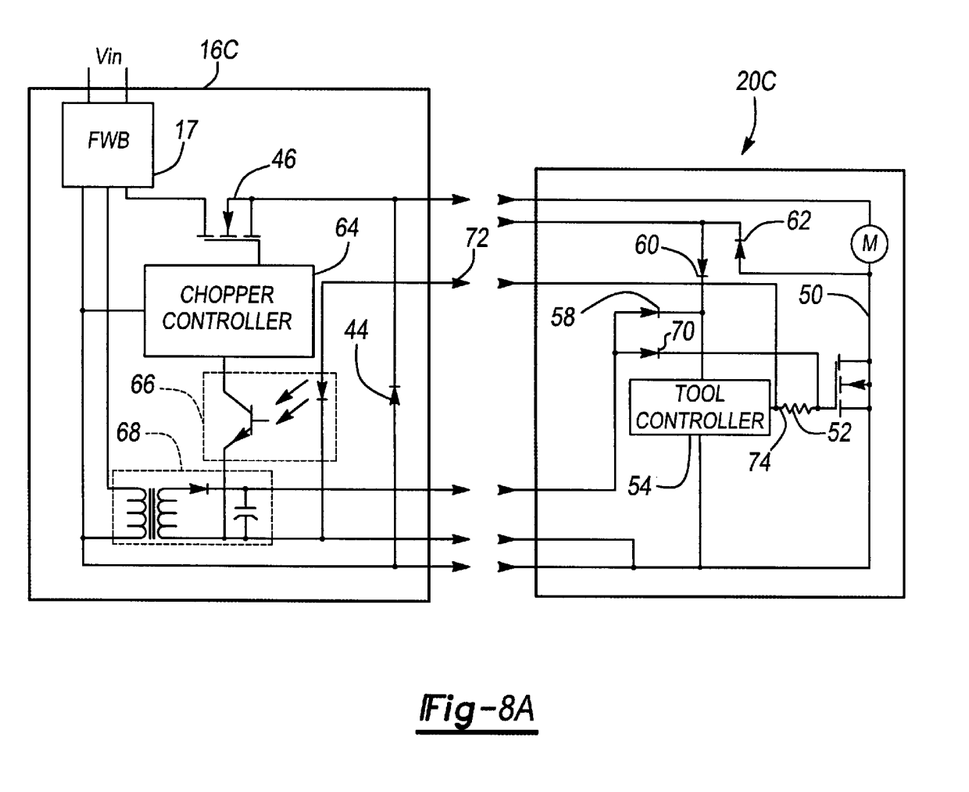
FIG. 8A is a detailed block diagram of presently preferred embodiment of a power system for the power device.

Referring to FIG. 8A, a presently preferred embodiment of a power tool power subsystem conforming to the principles of the invention is illustrated. The presently preferred embodiment includes a chopper module 16c for chopping line power during line power mode, and a tool module 20c for chopping battery power during battery power mode. Similar to the second embodiment, the chopper module 16c comprises a FWB 17, a series switch 46, and a free-wheeling diode 44. In addition, the chopper module 16c includes a chopper controller 64, an interface circuit 66 and a module power circuit 68. The chopper controller 64 controls the series switch 46 in response to a duty cycle signal 72 from the tool module 20c that is transmitted through the interface circuit 66.

Similar to the second embodiment, the tool module 20c comprises a series switch 50 for chopping battery power during the battery power mode, a gate resistor 52, a tool controller 54, a diode 58, a free-wheeling diode 62, and a power diode 60 for supplying an alternate source of circuit power. In addition, the tool module 20c includes a signal diode 70 for providing the duty cycle signal to the chopper module 16c. The signal diode 70 is connected from the module power circuit 68 to the input of the series switch 50 to turn the switch 50 on continuously during line power mode. An output 74 of the tool controller 54 connects to the interface circuit 66 for providing a duty cycle signal 72.

The operation of the presently preferred embodiment is similar to the operation of the first embodiment with the exception of the method of coupling the pulse width signal from the tool module 20c to the chopper module 16c. During line power mode, the module power circuit 68 of the chopper module 16c forces the tool module series switch 50 on continuously and provides circuit power to the tool module 16c. When the output 74 of the tool module controller 54 is in the high state, current from the output 74 flows through the interface circuit 66 of the chopper module 16c providing duty cycle information. The chopper controller 64 averages the pulsed duty cycle information and in response controls the chopper module series switch 46. Averaging the duty cycle information permits the chopper controller 64 and the tool controller to be operated unsynchronized.

Figure 8B:
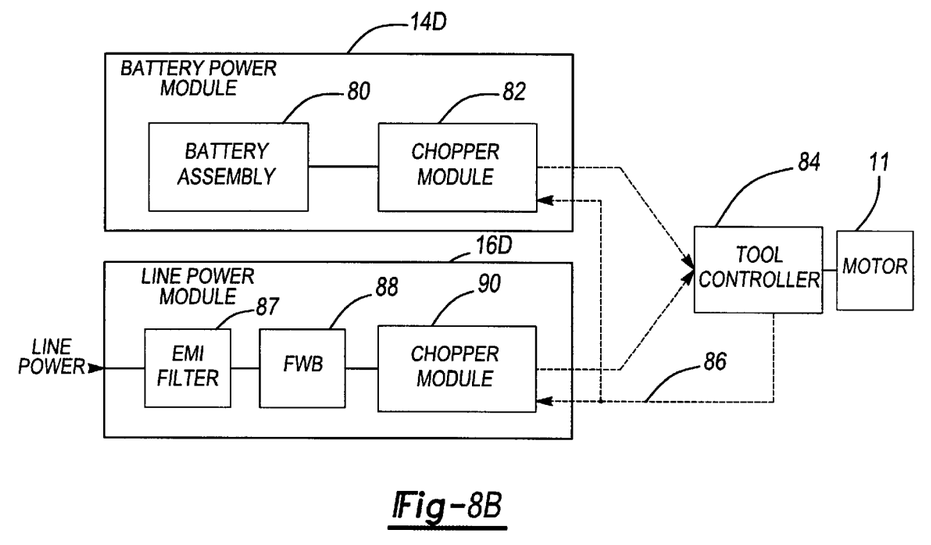
FIG. 8B is a block diagram of a third configuration of a power system for the power device.

Referring to FIG. 8B, an alternative embodiment in accordance with the principles of the invention is illustrated. This embodiment differs from the previous embodiments in that a chopper module that is common to the power path of both the battery power module and the line power module is not included. Instead, a unique chopper module is included for each of the battery power module 14d and the line power module 16d. This configuration provides higher efficiency during the line power operating mode by eliminating one MOSFET from the primary conduction path. However, placing a MOSFET within the battery power module increases the heat to which the battery assembly is subjected.

The battery power module 14d includes a battery assembly 80 for supplying battery power. A chopper module 82 converts the battery power to a series of voltage pulses that are coupled through a tool controller 84 to the motor 11. A duty cycle signal 86 is coupled from the tool controller 84 to the chopper module 82 for controlling the duty cycle of the voltage pulses. The chopper module 82 includes a relatively low voltage MOSFET (not shown) for chopping the voltage supplied by the battery assembly 80.

The line power module 16*d* includes an EMI filter 87 and FWB 88 for attenuating high frequency components and rectifying the line power. The output of the FWB 88 is coupled to a chopper module 90 that converts the rectified line power to a series of voltage pulses that are coupled through the tool controller 84 to the motor 11. The duty cycle signal 16*d* from the tool controller 84 is coupled to the chopper module 90 of the line power module 78. A relatively high voltage MOSFET (not shown) is employed in the chopper module 90 for chopping the rectified voltage supplied through the FWB 88.

As illustrated in the previously described embodiments, the invention is preferably practiced with a non-transformer-isolated line power module, although it is within the scope of the invention to employ transformer isolation. The non-transformer-isolated technique is described in previously filed U.S. application Ser. No. 09/458,285. Eliminating the power transformer in addition to eliminating the output filter provides additional cost savings and an additional reduction in the circuit complexity and size. Therefore, the preferred embodiment of the invention is practiced with a non-isolated line power module 16. As described more fully below, the elimination of transformer isolation impacts the type of housing and power interface that are employed in a power tool 12.

Returning to FIG. 1, although the power tool motor 11 of the presently preferred embodiment is designed to be powered by a relatively low voltage DC power source (i.e., a DC source less than 42.4 volts), the housing 91 of the power tool 12 in the preferred embodiment is nonetheless double insulated from the electrical system of the tool. As is well known to those skilled in the art, power tools designed to be operated by a high voltage power source, such as a conventional AC or corded power tool, are typically constructed so that the housing of the tool is double insulated from the electrical system of the tool for safety reasons. In this manner, the operator of the tool is protected against electrical shock in the event of a short in the electrical system of the tool. Generally, cordless or DC powered tools are powered by low voltage power sources and therefore do not require such safety measures. Consequently, conventional DC powered tools do not insulate the housing from the electrical system of the tool.

There are of course, many DC powered portable devices that are alternatively powered from high voltage AC house current. To enable this alternative operation, however, AC/DC powered devices generally employ output filters in combination with transformers to provide a DC output that is isolated from the high voltage AC power source. The DC output provides the power required to operate the power device.

While this solution may be acceptable for relatively low powered devices, such as portable stereos, the power requirements of many portable power tools necessitates the use of large output filters and step-down transformers which are not only bulky, but also very heavy. Consequently, DC powered tools that can alternatively be powered from AC house current have rarely been offered commercially.

The present invention solves this dilemma by providing a relatively light weight converter that has a non-filtered output for driving the power device. By eliminating the output filter in the presently preferred chopper module 21*a* of FIG. 3, the output voltage supplied to the motor 11 of the power tool 12 is a series of voltage pulses. The inductance 22 of the motor 11 is used to filter the voltage pulses so that an average voltage that is compatible with the motor 11 is applied. In the preferred embodiment, the step-down transformer is eliminated in addition to eliminating the output filter. By eliminating transformer-isolation in the presently preferred chopper module 21*a*, the output voltage supplied to the motor of the power tool 12 is referenced to the 115 volt AC input. Consequently, double insulation of the tool housing from the electrical system of the power tool is necessary. A double insulated housing is also necessary when a step-down transformer is employed that provides an output having a maximum voltage amplitude that is greater than 42.4 volts.

In addition, since the presently preferred embodiment does not employ a step-down transformer, the power interface is provided with male connectors uniquely adapted to make electrical contact with, and thereby receive electrical power from, specially recessed female connectors in the line power module 16. Thus, despite the non-isolated construction of the line power module 16, all applicable safety requirements for operating a power tool from a high voltage power source are satisfied. Following is a detailed description of the housing and power interface that is employed in the presently preferred embodiment of the invention.

Figure 9:
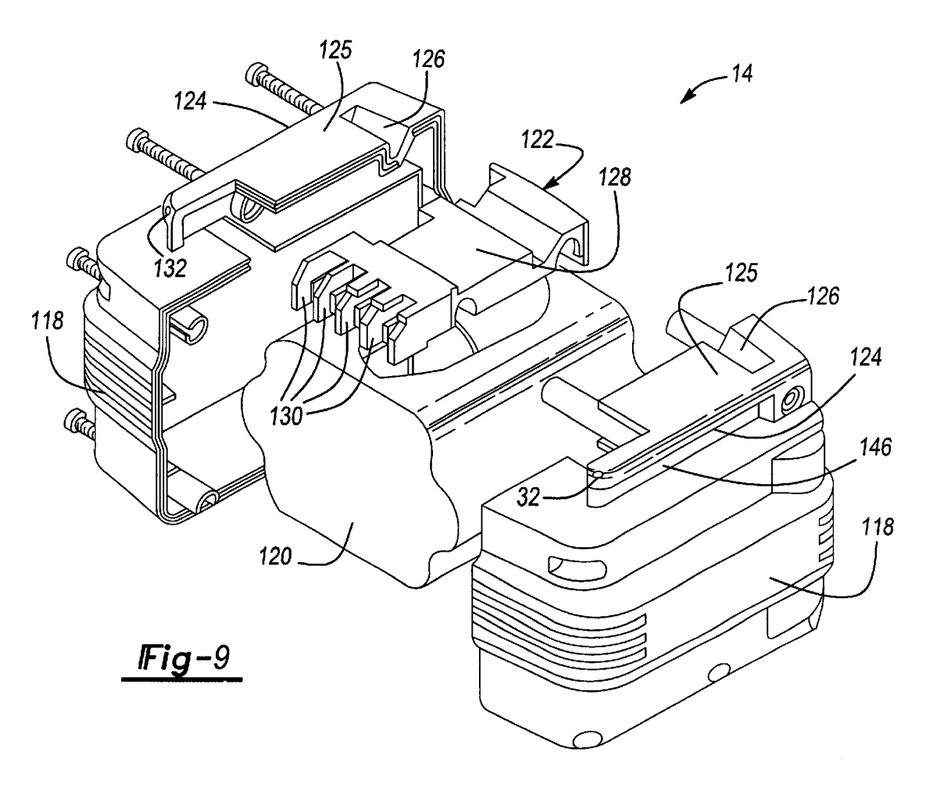
FIG. 9 is a three-dimensional exploded view of the battery power module of the presently preferred embodiment of the invention.
Figure 11:
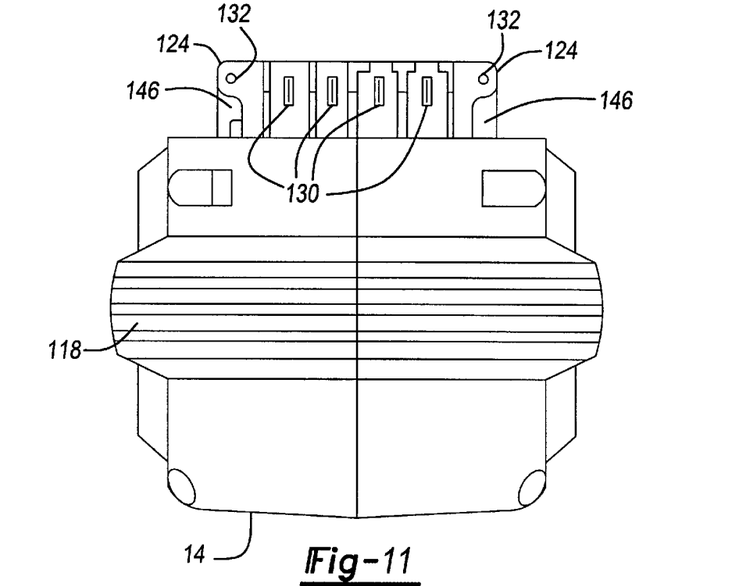
FIG. 11 is an end view of the battery power module illustrating an attached terminal block.

With particular reference to FIGS. 9 and 11, the battery power module 14 of the present invention is illustrated to generally include a housing 118, a battery 120 which in the exemplary embodiment illustrated is a 24 volt nickel-cadmium battery, and a battery pack terminal block 122. To facilitate releasable attachment of the battery power supply module 14 to the tool 12, the upper portion 125 of the housing 118 is formed to include a pair of guide rails 124. The guide rails 124 are adapted to be slidably received into cooperating channels 113 (FIG. 1) formed in a handle 92 of the tool 12. To further facilitate removable attachment of the battery power supply module 14 to the tool 12, the upper portion 125 of the housing 118 further defines a recess 126. The recess 126 is adapted to receive a latch (not shown) carried by the housing of the tool 12. The latch is conventional in construction and operation and is spring biased to a downward position so as to engage the recess 126 upon insertion of the rechargeable battery power supply module 14. Removal of the battery power supply module 14 is thereby prevented until the spring bias of the latch is overcome in a conventional manner insofar as the present invention is concerned.

With continued reference to FIGS. 9 and 11, the battery pack terminal block 122 comprises a main body portion 128 constructed of rigid plastic or other suitable material and a plurality of blade-type terminals 130. In the exemplary embodiment illustrated, the battery pack terminal block 122 includes four blade terminals 130. Two of the blade terminals 130 comprise the positive and negative terminals for the battery 120. A third terminal 130 may be used to monitor the temperature of the battery 120 and a fourth terminal may be used to identify the battery type (e.g., 24 volt NiCad). As best shown in FIG. 11, a pair of holes 132 are formed in the two guide rails 124 in the upper portion 125 of the battery pack housing 118 on either side of the row of blade terminals 130. The function of these holes is described below.

Figure 12:
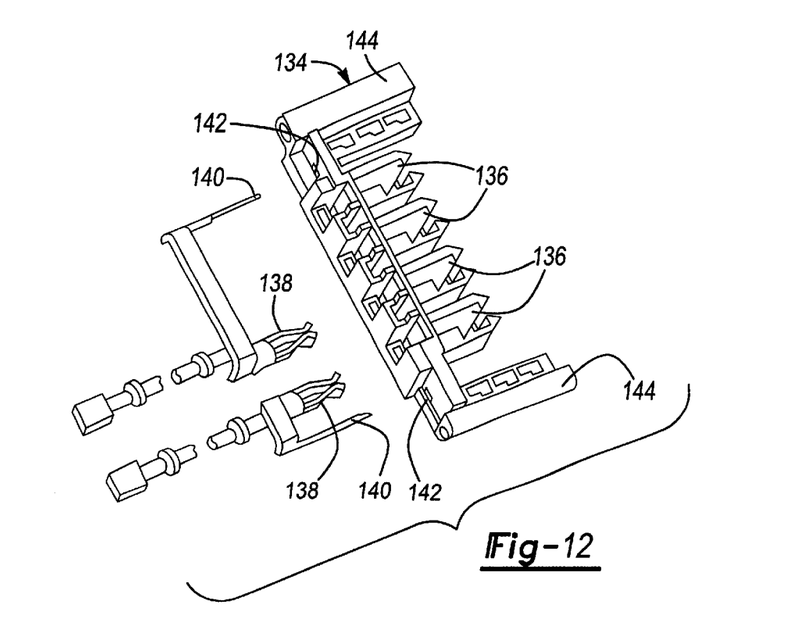
FIG. 12 is a three-dimensional view of the power tool terminal block that mates to both the battery power module terminal block and the converter power module terminal block.

Turning now to FIG. 12, the terminal block 134 of the power tool 12 is shown. The main body of the tool terminal block 134 is also constructed of a rigid plastic material and is formed with a row of four U-shaped guideways 136 guiding the four corresponding blade terminals 130 of the battery power supply module 14 when the battery pack is inserted into the tool 12. Located within the guideways 136 are female connectors 138 that are adapted to engage and make electrical contact with the blade terminals 130 of the battery power supply module 14. Although the tool terminal block 134 shown is designed to accommodate four female connectors for each of the four battery pack blade terminals 130, only two female connectors 138 adapted to engage the positive and negative blade terminals 130 of the battery power supply module 14 are used in the tool terminal block 134, as the remaining two battery pack blade terminals 130 are only used when recharging the battery power supply module 14.

Also connected to the positive and negative female terminals 138 in the tool terminal block 134 are positive and negative male terminals 140 that project through openings 142 in the terminal block on either side of the row of guideways 136. As will subsequently be discussed below, the male positive and negative terminals 140 are used to electrically connect the tool 12 to the AC/DC converter module 16.

Figure 13:
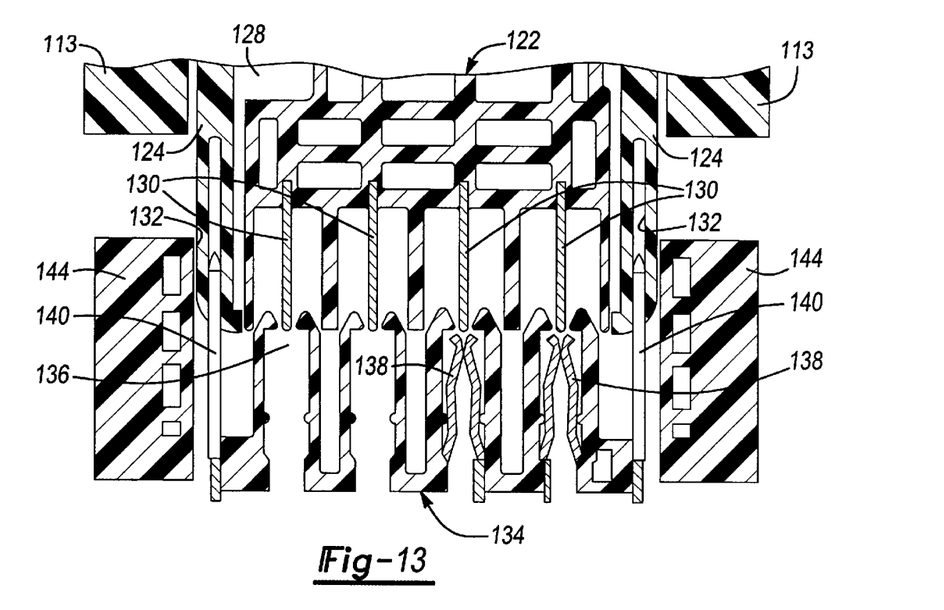
FIG. 13 is a two-dimensional view of the interface between the battery power module terminal block and the power tool terminal block.

With additional reference to FIG. 13, the interface between the battery terminal block 122 and the tool terminal block 134 is illustrated. As the guide rails 124 of the battery power supply module 14 are slid into the channels 113 in the tool housing, the battery pack terminal block 122 is guided into alignment with the tool terminal block 134 as shown. To further facilitate proper alignment between the two terminal blocks 122 and 134, the main body portion of the tool terminal block 134 includes a pair of laterally spaced rails 144 that are adapted to be received within the grooves 146 provided in the battery pack housing 118 immediately below the guide rails 124. Further insertion of the battery power module 14 into the tool 12 results in the positive and negative blade terminals 130 of the battery power module 14 passing through the openings in the U-shaped guideways 136 and engaging the female connectors 138 in the tool terminal block 134. Note that the male positive and negative terminals 140 from the tool terminal block 134 simultaneously project into the openings 132 formed in the rails 124 on the upper portion 125 of the battery pack housing 118, but do not make electrical contact with any terminals in the battery power module 14. Similarly, the remaining two blade terminals 130 from the battery terminal block 122 project into empty guideways 136 in the tool terminal block 134.

Figure 10:
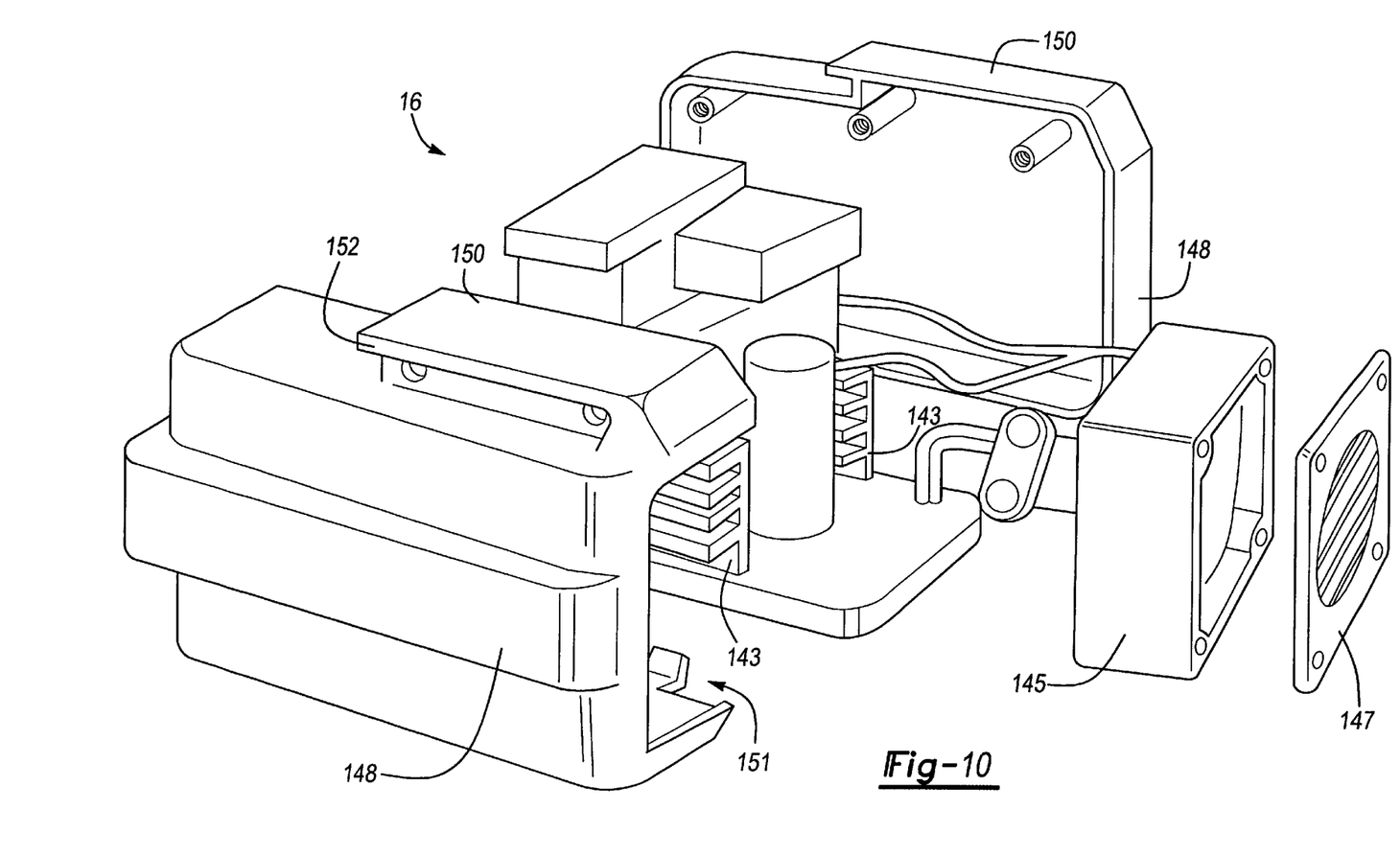
FIG. 10 is a three-dimensional exploded view of the line power module of the presently preferred embodiment of the invention.

Returning to FIG. 2 with reference to FIG. 10, the line power module 16 according to the present invention is adapted to convert 115 volts AC house current to a pulsed output having an average DC voltage of 24 volts. The housing 148 of the converter module 16 in the preferred embodiment is configured to be substantially similar to the housing 118 of the battery power module 14. In this regard, the housing 148 includes first and second clam shell halves joined at a longitudinally extending parting line. An upper portion 150 of the housing 148 includes a pair of guide rails 152 similar to those of the battery power supply module 14 for engaging the channels 113 in the tool housing. The upper portion 150 also defines a recess (not shown) which includes a latch (not shown) for preventing the inadvertent removal of the converter module 16. The housing 148 also defines a recess 151 in which a fan 145 is adapted for providing cooling airflow to the converter module 16. Attached to the fan 145 is a fan cover 147 for preventing foreign objects from impeding the operation of the fan 145. Within the housing 148 several heatsinks 143 provide heat spreading and cooling for selected power converter components.

Figure 14:
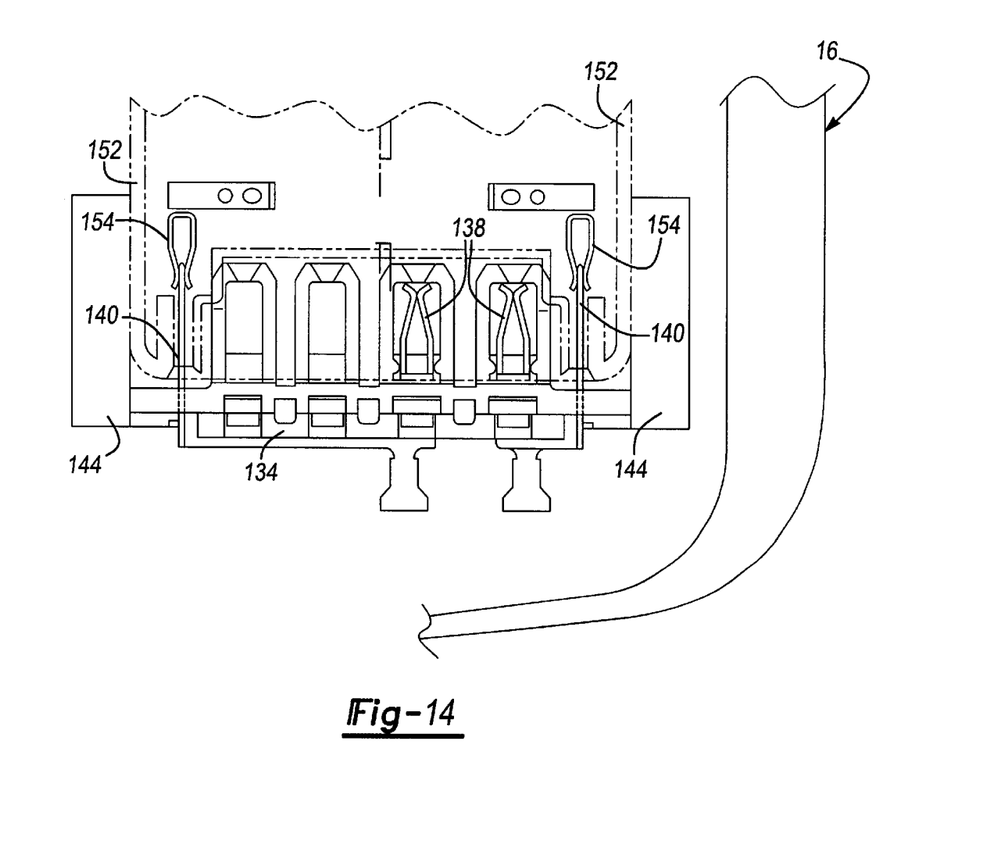
FIG. 14 is a two-dimensional view of the interface between the line power module and the power tool terminal block.

With additional reference to FIG. 14, the interface between the line power module 16 and tool terminal block 134 is shown. The line power module 16 includes a pair of female terminals 154 that are adapted to receive the male terminals 140 of the tool terminal block 134. In a manner similar to that described above in connection with the installation of the battery power module 14 on the tool 12, the guide rails 152 on the upper portion 150 of the converter housing 148 are adapted to engage the laterally spaced rails 144 on the tool terminal block 134 as the line power module 16 is installed on the tool 12 to ensure proper alignment between the female connectors 154 of the line power module 16 and the male connectors 140 of the tool 12.

Due to the non-isolated nature of the line power module 16 in the presently preferred embodiment, the female terminals 154 are recessed within the upper portion 150 of the housing 148 of the line power module 16 to meet safety requirements. In the preferred embodiment, the female terminals 154 are recessed within the housing 148 of the line power module 16 by at least 8 mm. 115 volt AC power is converted to a pulsed voltage output by the line power module 16 and delivered to the tool 12 through the female terminals 154. When the line power module 16 is operatively installed on the tool 12, the female terminals 138 of the tool terminal block 134 are electrically inoperative.

The line power module 16 initially converts the low frequency AC input to a rectified voltage, then the chopper module 21*a* converts the rectified voltage to a high frequency pulsed voltage output that has an average DC level suitable for operating power tool 12. The power tool 12 uses the inductance 22 of the motor 11 to filter the pulsed output of the chopper module 21*a* rather than including an output filter within the chopper module 21*a*, thereby significantly reducing the cost and weight of the chopper module 21*a*.

In addition, the power tool employs double insulation of the motor 11 rather than transformer isolation of the chopper module 21*a*, thereby further reducing the cost and weight of the chopper module 21*a*.

Additionally, the chopper module 21*a* is designed with a comparatively small number of components while providing an efficient conversion process. This further enhances the lightweight, compact features of the chopper module 21*a*. The size of the chopper module 21*a* further permits the use of the line power module 16 in power-operated devices, such as the reciprocating saw 12, which heretofore were too small to support and contain conversion units providing power in a range of at least 50 watts and higher.

Further, while the preferred embodiment of the chopper module 21*a* converts a low frequency, high voltage level to a pulse train having a DC voltage level suitable for operating the motor 11, the chopper can be used to convert a high DC voltage level to a pulse train by applying the high DC level directly to a suitable power cord and plug that connects to the input of the line power module 16. In this manner, the power tool 12 could be operated from the high DC voltage source instead of the low DC voltage of the cells and thereby conserve the charge life of the cells.

The chopper module 21*a* could be designed to operate from external AC power sources other than 120 volts at 60 Hz. Without departing from the spirit and scope of the invention, the chopper module 21*a* also could be designed to provide a voltage pulse output having a DC output voltage level in a range of 3.6 to 48 volts. In a particular example, the chopper module 21*a* could be adjusted to develop a pulse output having a DC voltage output level of 24 volts, derived from an external AC source of 220 volts at 50 Hz as applied to a suitable power plug and cord. The chopper module 21*a* could then be used to provide inexpensive dual mode capability for power-operated devices that operate at a DC voltage supply level of 24 volts.

The reciprocating saw 12 is merely illustrative of one example of many power-operated, cordless-mode devices that become more versatile because of the inventive cost efficient dual-mode capability. Other examples of power-operated cordless devices which are enhanced by the inventive concept include, but are not limited to, drills, screwdrivers, screwdriver-drills, hammer drills, jig saws, circular saws, hedge trimmers, grass shears, as well as battery-operated household products and the like.

Thus it will be appreciated from the above that as a result of the present invention, an inexpensive dual-mode corded/cordless system for power-operated devices is provided by which the principal objectives, among others, are completely fulfilled. It will be equally apparent and is contemplated that modification and/or changes may be made in the illustrated embodiment without departure from the invention. Accordingly, it is expressly intended that the foregoing description and accompanying drawings are illustrative of preferred embodiments only, not limiting, and that the true spirit and scope of the present invention will be determined by reference to the appended claims and their legal equivalent.

What is claimed is:

1. A corded/cordless system for power tools comprising:
   a low-voltage DC power tool operable in a preselected voltage range, said power tool having;
   an exterior, an interior, a pre-defined interface for mechanically and electrically mating with a power module having a source of electric power, and a motor of a predetermined rating having a predetermined minimum inductance; and
   a chopper module to convert input power from the source of electric power to an average DC motor voltage in the preselected voltage range suitable for powering the low-voltage DC power tool, said chopper module including a chopper circuit operable at a predetermined switching frequency to convert the input power to an output voltage comprising a series of voltage pulses that are averaged across the motor predetermined minimum inductance, thereby supplying the average DC motor voltage to the motor.

2. The corded/cordless system of claim 1 further comprising a cordless battery power module mechanically and electrically configured to mate with the power tool and to contain a battery assembly having a DC voltage at least equal to a lower limit of the preselected voltage range suitable for powering the low-voltage DC power tool, said battery power module to provide power to the DC power tool.

3. The corded/cordless system of claim 1 further comprising a corded AC power module mechanically and electrically configured to mate with the power tool, said AC power module coupled between a source of AC electric power and the power tool, such that input power from the source of AC electric power is provided to the chopper module.

4. The corded/cordless system of claim 3 further comprising:
   a cordless battery power module for providing power to the DC power tool, mechanically and electrically configured to mate with the power tool and to include a battery assembly having a DC voltage at least equal to a lower limit of the preselected voltage range suitable for powering the low-voltage DC power tool;
   wherein the power tool pre-defined interface further comprises a physical envelope configuration to accept either of said corded AC power module and said cordless battery power supply module.

5. The corded/cordless system of claim 4 wherein the chopper circuit changes the duty cycle of the voltage pulses to cause a change in the average DC motor voltage, thereby changing the operating speed.

6. The corded/cordless system of claim 1 wherein the series of voltage pulses have a duty cycle and the chopper module further comprises a chopper controller operable to control a chopper switch such that the duty cycle of the series of voltage pulses is controlled, thereby controlling the average DC motor voltage applied to the motor.

7. The corded/cordless system of claim 6 wherein the output voltage of the chopper module is not transformer-isolated from the source of electric power.

8. A corded/cordless system for power tools, comprising:
   a low-voltage DC power tool operable in a preselected voltage range, said power tool including;
   an exterior, an interior, and a pre-defined interface for mechanically and electrically mating with a power module;
   a motor of a preselected rating having a predetermined minimum inductance and an operating speed; and
   a tool module to control the operating speed of the motor; and
   a corded chopper power module to convert line power from a source of electric power to a series of voltage pulses having an average DC voltage in the preselected voltage range suitable for powering the low-voltage DC power tool, said corded chopper power module mechanically and electrically configured to connect to the source of electric power and to mate with the low-voltage DC power tool, said corded chopper power module including a chopper circuit operable at a predetermined switching frequency, in response to said tool module, to convert the line power to said series of voltage pulses having a duty cycle, said voltage pulses being averaged across the motor predetermined minimum inductance, thereby applying the average DC voltage to the motor.

9. The corded/cordless system of claim 8 further comprising:
   a cordless battery power module mechanically and electrically configured to mate with the power tool and to contain a battery assembly having a DC voltage at least equal to a lower limit of the preselected voltage range suitable for powering the low-voltage DC power tool, said battery power module to provide power to the DC power tool; and
   wherein said tool module converts power from the cordless battery power module to a series of voltage pulses having an average DC motor voltage in the preselected voltage range suitable for powering the low-voltage DC power tool, said tool module including a chopper circuit operable at a predetermined switching frequency to convert the battery power module DC voltage to said series of voltage pulses having a duty cycle, said voltage pulses being averaged across the motor predetermined minimum inductance of said motor, thereby applying the average DC motor voltage to the motor;
   wherein the power tool is configured to receive power from either the corded chopper power module or the battery power module.

10. The corded/cordless system of claim 8 wherein the chopper power module, in response to the tool module, controllably varies the duty cycle of the voltage pulses, thereby controlling the average DC motor voltage such that the operating speed of the motor is controlled.

11. The corded/cordless system of claim 10 wherein the tool module further comprises a first switch coupled between the chopper power module and the motor, said first switch having a conducting state and a non-conducting state.

12. The corded/cordless system of claim 11 wherein the first switch is continuously in the conducting state when the corded chopper power module is mated to the power tool.

13. The corded/cordless system of claim 11 wherein the chopper circuit includes a second switch for converting line power to the series of voltage pulses, said second switch having a conducting state and a non-conducting state, and wherein the first switch is switched to the conducting state a predetermined time before the second switch is switched to the conducting state.

14. The corded/cordless system of claim 11 wherein the tool module further comprises a conduction signal coupled to the chopper power module for providing a pulse width reference signal, wherein the chopper power module sets the pulse width of the series of voltage pulses to correspond with the conduction signal.

15. The corded/cordless system of claim 14 wherein the power tool further includes a sensor for providing a feedback signal corresponding to the motor operating speed.

16. The corded/cordless system of claim 15 wherein the sensor is selected from the group of: a tachometer, a motor back EMF voltage monitor, motor current monitor, and a motor average voltage monitor, and a DSP of motor current commutation.

17. A corded/cordless system for power tools, comprising:
a low-voltage DC power tool operable in a preselected voltage range, said power tool including;
an exterior, an interior, a pre-defined interface for mechanically and electrically mating interchangeably with a power module;
a motor of a predetermined rating having a predetermined minimum inductance; and
a tool control to control the operating speed of the motor; and
a source power module to convert electric power from a source of electric power to a series of voltage pulses having an average DC motor voltage in the preselected voltage range suitable for powering the low-voltage DC power tool, said source power module mechanically and electrically configured to connect to the source of electric power and to mate with the low-voltage DC power tool, said source power module including a filterless chopper circuit operable at a predetermined switching frequency, in response to said tool control, to convert the electric power to the series of voltage pulses having a pulse width, said voltage pulses being averaged across the motor predetermined minimum inductance, thereby applying the average DC motor voltage to the motor.

18. The corded/cordless system of claim 17 wherein the source power module comprises a battery power module for supplying converted battery power to the corded/cordless system, said battery power module including a battery assembly for providing the electric power and a chopper circuit for converting the electric power to said series of voltage pulses, said battery assembly having a DC voltage at least equal to a lower limit of the preselected voltage range suitable for powering the power tool.

19. The corded/cordless system of claim 17 wherein the source module comprises a line module for supplying converted line power to the corded/cordless system, said line module including an electrical connector for supplying electric power from a line power source and a chopper circuit for converting the electric power to said series of voltage pulses.

20. The corded/cordless system of claim 17 wherein the source power module, responsive to the tool control, controllably varies the duty cycle of the voltage pulses over a predetermined operating range to control the average DC motor voltage, thereby setting the operating speed.

21. The corded/cordless system of claim 20 wherein the tool control further comprises a conduction signal coupled to the source power module for providing a pulse width reference signal, wherein the source power module sets the pulse width of the series of voltage pulses to correspond with the conduction signal.

22. The corded/cordless system of claim 21 wherein the power tool further includes a sensor for providing a feedback signal corresponding to the motor operating speed.

23. The corded/cordless system of claim 22 wherein the sensor is selected from the group of: a tachometer, a motor back EMF voltage monitor, motor current monitor, motor average voltage monitor, and a DSP of motor current commutation.

24. The corded/cordless system of claim 17 wherein the source power module further comprises a power switch.

25. The corded/cordless system of claim 24 wherein the power switch is selected from the group of; MOSFETs, IGBTs, MCT's, and BJTs.

26. A method of supplying power to a DC power tool operable in a preselected voltage range, said power tool including exposed surfaces and a DC motor having a winding inductance, the method comprising the steps of:
determining the winding inductance of the motor;
providing electrical power from a source of power;
converting the electrical power to a series of voltage pulses having a duty cycle, an average voltage, and a predetermined operating frequency;
selecting the operating frequency of the voltage pulses to correspond with the winding inductance of the motor;
setting the duty cycle of the voltage pulses such that the average voltage is within the preselected range suitable for powering the DC motor;
coupling the series of voltage pulses to the DC motor, whereby the motor is powered from the source of electric power.

27. The method of claim 26 further comprising the step of insulating the exposed surfaces of the DC power tool to prevent the surfaces from becoming electrically energized, so that transformer-isolation of the source of power from the series of voltage pulses is not required.

* * * * *